United States Patent
Tovar et al.

(10) Patent No.: US 9,261,988 B2
(45) Date of Patent: Feb. 16, 2016

(54) OPERATOR CONTROL APPARATUS IN A MOTOR VEHICLE

(75) Inventors: Johannes Tovar, Ingolstadt (DE); Tahar Bouaziz, Gaimersheim (DE); Heike Sacher, Munich (DE)

(73) Assignee: AUDI AG, Ingolstadt (DE)

( * ) Notice: Subject to any disclaimer, the term of this patent is extended or adjusted under 35 U.S.C. 154(b) by 436 days.

(21) Appl. No.: 13/512,514

(22) PCT Filed: Nov. 26, 2010

(86) PCT No.: PCT/EP2010/007184
§ 371 (c)(1),
(2), (4) Date: Aug. 6, 2012

(87) PCT Pub. No.: WO2011/063973
PCT Pub. Date: Jun. 3, 2011

(65) Prior Publication Data
US 2013/0113726 A1    May 9, 2013

(30) Foreign Application Priority Data
Nov. 27, 2009 (DE) .......................... 10 2009 056 186

(51) Int. Cl.
*G06F 3/041* (2006.01)
*G06F 3/0488* (2013.01)
(Continued)

(52) U.S. Cl.
CPC ................ *G06F 3/041* (2013.01); *B60K 37/06* (2013.01); *G06F 3/0362* (2013.01); *G06F 3/03547* (2013.01); *G06F 3/0488* (2013.01); *B60K 2350/1024* (2013.01); *B60K 2350/1032* (2013.01); *B60K 2350/1036* (2013.01); *B60R 1/04* (2013.01); *B60R 11/04* (2013.01); *B60R 2001/1223* (2013.01); *B60R 2011/0059* (2013.01); *B60R 2011/0288* (2013.01)

(58) Field of Classification Search
CPC .............. G06F 3/0362; G06F 3/04847; G06F 3/04804; G06F 3/0312; G06F 3/041; G06F 3/0488; G06F 3/03547; B60K 37/06; B60K 2350/1024; B60K 35/00; B60K 37/02; B60K 2350/1036; B60K 2350/1032; H01H 19/14; H01H 25/065; B60R 11/04; B60R 1/04; B60R 2001/1223; B60R 2011/0288; B60R 2011/0059
USPC ................................. 345/173, 184; 701/1, 36
See application file for complete search history.

(56) References Cited

U.S. PATENT DOCUMENTS

| 5,231,380 A | 7/1993 | Logan |
| 5,339,213 A | 8/1994 | O'Callaghan |

(Continued)

FOREIGN PATENT DOCUMENTS

| CN | 101466568 | 6/2009 |
| DE | 199 35 343 | 2/2001 |

(Continued)

OTHER PUBLICATIONS

Meriam, J. L., et al., Engineering Mechanics, Statics, 2nd Ed. 1986, John Wiley and Sons, p. 33 and 243.*

(Continued)

*Primary Examiner* — Michael J Eurice
(74) *Attorney, Agent, or Firm* — Staas & Halsey LLP

(57) ABSTRACT

An apparatus for controlling at least one function of a motor vehicle has a touch-sensitive input panel. The touch-sensitive input panel includes a transparent material.

10 Claims, 2 Drawing Sheets

(51) Int. Cl.

| | |
|---|---|
| *B60K 37/06* | (2006.01) |
| *G06F 3/0354* | (2013.01) |
| *G06F 3/0362* | (2013.01) |
| *B60R 11/04* | (2006.01) |
| *B60R 1/12* | (2006.01) |
| *B60R 1/04* | (2006.01) |
| *B60R 11/02* | (2006.01) |
| *B60R 11/00* | (2006.01) |

(56) References Cited

U.S. PATENT DOCUMENTS

| | | | | |
|---|---|---|---|---|
| 5,543,588 | A * | 8/1996 | Bisset et al. | 178/18.06 |
| 6,025,831 | A | 2/2000 | Gardiner | |
| 7,084,859 | B1 * | 8/2006 | Pryor | 345/173 |
| 7,489,303 | B1 * | 2/2009 | Pryor | 345/173 |
| 7,671,851 | B1 * | 3/2010 | Pryor | 345/184 |
| 8,199,114 | B1 * | 6/2012 | Jaeger et al. | 345/173 |
| 8,471,822 | B2 * | 6/2013 | Lightenberg | 345/173 |
| 2003/0064748 | A1 * | 4/2003 | Stulberger | 455/556 |
| 2004/0021633 | A1 * | 2/2004 | Rajkowski | 345/156 |
| 2004/0049324 | A1 * | 3/2004 | Walker | 701/1 |
| 2004/0051392 | A1 * | 3/2004 | Badarneh | 307/112 |
| 2004/0056847 | A1 * | 3/2004 | Yoshihara | 345/173 |
| 2004/0119701 | A1 * | 6/2004 | Mulligan et al. | 345/173 |
| 2004/0132498 | A1 * | 7/2004 | Clabunde et al. | 455/566 |
| 2004/0140959 | A1 * | 7/2004 | Matsumura et al. | 345/173 |
| 2004/0233159 | A1 * | 11/2004 | Badarneh | 345/156 |
| 2005/0046584 | A1 * | 3/2005 | Breed | 340/825.72 |
| 2005/0128065 | A1 * | 6/2005 | Kolpasky et al. | 340/461 |
| 2005/0195946 | A1 * | 9/2005 | Hornig | 378/204 |
| 2005/0276448 | A1 * | 12/2005 | Pryor | 382/103 |
| 2006/0022954 | A1 | 2/2006 | Berry | |
| 2006/0095177 | A1 * | 5/2006 | Donk et al. | 701/36 |
| 2006/0147051 | A1 * | 7/2006 | Smith et al. | 381/71.2 |
| 2006/0185128 | A1 * | 8/2006 | Lacroix et al. | 16/441 |
| 2007/0040072 | A1 * | 2/2007 | Kageyama et al. | 248/27.1 |
| 2007/0069880 | A1 * | 3/2007 | Best et al. | 340/461 |
| 2007/0132572 | A1 * | 6/2007 | Itoh et al. | 340/462 |
| 2007/0211023 | A1 * | 9/2007 | Boillot | 345/156 |
| 2007/0236450 | A1 * | 10/2007 | Colgate et al. | 345/156 |
| 2007/0247295 | A1 * | 10/2007 | Donath et al. | 340/461 |
| 2007/0273638 | A1 * | 11/2007 | Nohno et al. | 345/156 |
| 2008/0023313 | A1 * | 1/2008 | Sack et al. | 200/400 |
| 2008/0091309 | A1 * | 4/2008 | Walker | 701/1 |
| 2008/0129707 | A1 * | 6/2008 | Pryor | 345/175 |
| 2008/0173127 | A1 * | 7/2008 | Ackert et al. | 74/552 |
| 2008/0211779 | A1 * | 9/2008 | Pryor | 345/173 |
| 2008/0212215 | A1 * | 9/2008 | Schofield et al. | 359/844 |
| 2008/0236450 | A1 * | 10/2008 | Bonafous et al. | 106/690 |
| 2008/0238879 | A1 * | 10/2008 | Jaeger et al. | 345/173 |
| 2008/0309634 | A1 * | 12/2008 | Hotelling et al. | 345/173 |
| 2009/0127078 | A1 * | 5/2009 | Hostmann et al. | 200/4 |
| 2009/0131117 | A1 * | 5/2009 | Choi | 455/566 |
| 2009/0132130 | A1 * | 5/2009 | Kumon et al. | 701/49 |

FOREIGN PATENT DOCUMENTS

| | | | | |
|---|---|---|---|---|
| DE | 103 04 704 | | 8/2004 | |
| DE | 103 04 720 | | 8/2004 | |
| DE | 10 2004 031 659 | | 6/2006 | |
| DE | 102005012010 | * | 9/2006 | B60R 11/02 |
| DE | 102005033028 | * | 12/2006 | B60R 11/02 |
| DE | 10 2006 012 147 | | 3/2007 | |
| DE | 10 2007 042 650 | | 3/2009 | |
| EP | 0181196 | | 5/1986 | |
| GB | 2299394 | | 10/1996 | |
| JP | 2005-96519 | | 4/2005 | |
| WO | 02/03533 | | 1/2002 | |

OTHER PUBLICATIONS

English language translation of International Preliminary Report on Patentability for PCT/EP2010/007184.
Germany Office Action for Priority Germany Application No. 10 2009 056 186.2, issued on Nov. 22, 2010.
International Search Report for PCT/EP2010/007184, mailed on Mar. 3, 2011.
PCT/EP2010/007184, Nov. 26, 2010, Johannes Tovar et al., Audi AG and Audi Electronics Venture GmbH.
DE 10 2009 056 186.2, Nov. 27, 2009, Johannes Tovar et al., Audi AG and Audi Electronics Venture GmbH.
Chinese Office Action issued Sep. 2, 2014 in Chinese Patent Application No. 201080053716.8.

* cited by examiner

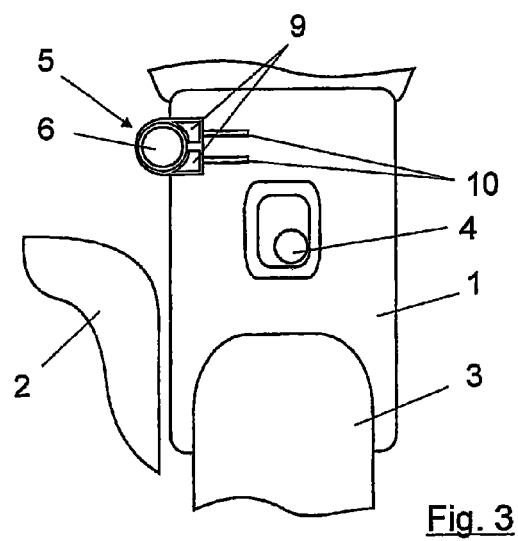
Fig. 3
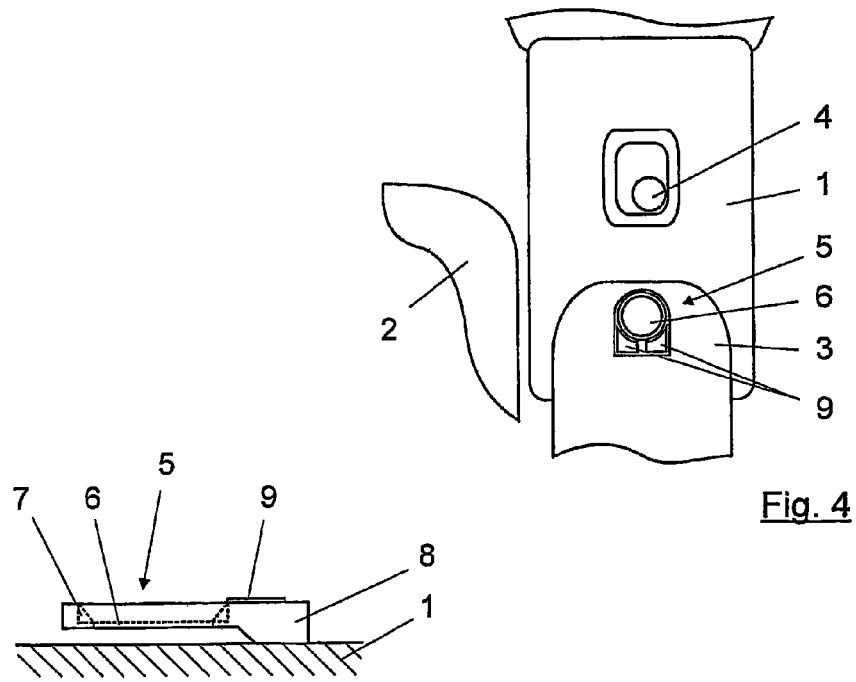
Fig. 4
Fig. 5

OPERATOR CONTROL APPARATUS IN A MOTOR VEHICLE

CROSS REFERENCE TO RELATED APPLICATIONS

This application is based on and hereby claims priority to International Application No. PCT/EP2010/007184 filed on Nov. 26, 2010 and German Application No. 10 2009 056 186.2 filed on Nov. 27, 2009, the contents of which are hereby incorporated by reference.

BACKGROUND

The following description relates to an apparatus for the operator control of at least one function of a motor vehicle and/or of at least one appliance installed in a motor vehicle.

An operator control apparatus is described in DE 10 2004 031 659 A1. In this case, an armrest includes a supplementary operator control element which complements an operator control element which is present in the dashboard. The supplementary operator control element may have a transparent touch-sensitive layer, beneath which further parts of the supplementary operator control element are arranged. However, although the touch-sensitive layer of the supplementary operator control element is transparent, it is not possible to perceive the underlying surface beneath the supplementary operator control element.

Another example of an apparatus is described in DE 103 04 704 A1 or DE 103 04 720 A1, for example. Such "touchpads", or touch-sensitive input panels, have recently also found their way into the interior of motor vehicles. In such an application, they can be used for operator control of a wide variety of functions of the motor vehicle or of an appliance installed in the motor vehicle, such as a navigation appliance, for example.

In order to allow appropriate operator control, these operator control panels require a relatively large surface area. However, a large surface area may be regarded as troublesome, particularly in high-end vehicles with correspondingly high-end interior fittings, because the touchpads in some cases require very large areas of the interior trim cut out. This interior trim removal greatly interferes with the aesthetics of the interior of the motor vehicle.

SUMMARY

Therefore, the following description relates to an apparatus for the operator control of a function of a motor vehicle or of an appliance installed in a motor vehicle, while providing the least possible disruption to the interior design aesthetic of the motor vehicle.

In accordance with one aspect of the present disclosure, an operator control apparatus for operator control of at least one function of a motor vehicle having a surface formed from a material includes a touch-sensitive input panel comprising a transparent material, wherein the touch-sensitive input panel is arranged above the surface of the motor vehicle such that the material forming the surface of the motor vehicle can be perceived through the touch-sensitive input panel.

Because the touch-sensitive input panel is produced from a transparent material, it can be fitted on any desired base support in the interior of the motor vehicle without disrupting the interior design and without requiring the provision of a cutout or the like on the base support. This results in significantly improved design freedom, in comparison with known solutions, for the area in which the touch-sensitive input panel is arranged. The material and the surface of the base support may be perceived through the touch-sensitive input panel, which is advantageous, particularly when the surface of the base support is made from a high-quality material, such as wood, metal, or leather, for example. Accordingly, operators of the motor vehicle may derive a particularly high-quality impression from the design of the interior of the motor vehicle.

In order to achieve a floating impression for the touch-sensitive input panel, the touch-sensitive input panel may be arranged at a distance from a base support.

This floating impression may also be reinforced when the distance between the touch-sensitive input panel and the base support is greater than or equal to approximately 3 millimeters.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 illustrates an embodiment of the apparatus;

FIG. 4 illustrates an embodiment of the apparatus according to the invention, and FIG. 5 illustrates a view of an embodiment of the apparatus in the direction of the arrow V from FIG. 1.

DETAILED DESCRIPTION

Figure 1:
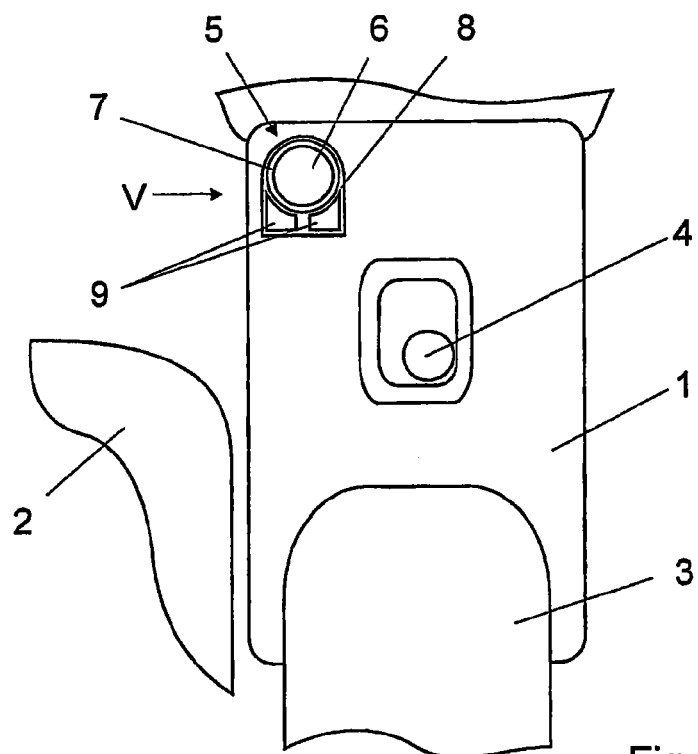
FIG. 1 illustrates an embodiment of the apparatus.

Reference will now be made in detail to embodiments of the present invention, examples of which are illustrated in the accompanying drawings, wherein like reference numerals refer to like elements throughout.

FIG. 1 illustrates a portion of a center console 1 in an interior of a motor vehicle, the entirety of which is not shown. Adjacent to the center console 1 is a vehicle seat 2, which is likewise not shown completely. Arranged above the center console 1 in a known configuration is an arm support or armrest 3 which may be foldable.

Next to a gear selector lever 4, the center console 1 furthermore holds an apparatus 5 for the operator control of at least one function of the motor vehicle and/or of at least one appliance installed in the motor vehicle. The apparatus 5 may be used to operate a wide variety of functions of the motor vehicle, such as the adjustment of shock absorbers, or particular engine maps, for example, and also different functions of various appliances installed in the motor vehicle, such as a navigation appliance, an air conditioning system, or a cruise control system, for example.

To this end, the apparatus 5 in the present case has, among other things, a touch-sensitive input panel 6 which may be produced from a transparent material, so that it is possible to selectively perceive functions on the input panel and the material and surface of the center console 1 through the touch-sensitive input panel 6. This is advantageous, particularly when the surface of the center console 1 is made from a high-quality material, such as wood, metal, or leather, for example. Accordingly, operators of the motor vehicle may derive a particularly high-quality impression inform the design of the interior of the motor vehicle. By way of example, a touch-sensitive input panel 6 of this kind may allow the use of character recognition to achieve particularly convenient operator control of the motor vehicle or of the appliance installed therein.

In addition to the touch-sensitive input panel 6, the apparatus 5 in the present case may also include a rotatable ring 7 which surrounds the touch-sensitive input panel 6. The rotatable ring 7 may be an input device for the operator control of at least one function of the motor vehicle and/or of the appliance installed in the motor vehicle. The rotatable ring 7 can thus be used to extend the functionality of the touch-sensitive input panel 6. In addition, the apparatus 5 in the exemplary embodiment shown also has two switching elements 9, which may be provided in the form of pressure switches, which are arranged on a frame 8 encompassing the touch-sensitive input panel 6 and the rotatable ring 7. The switching elements 9 may likewise perform particular operator control functions for the motor vehicle and/or the appliance installed therein.

Figure 2:
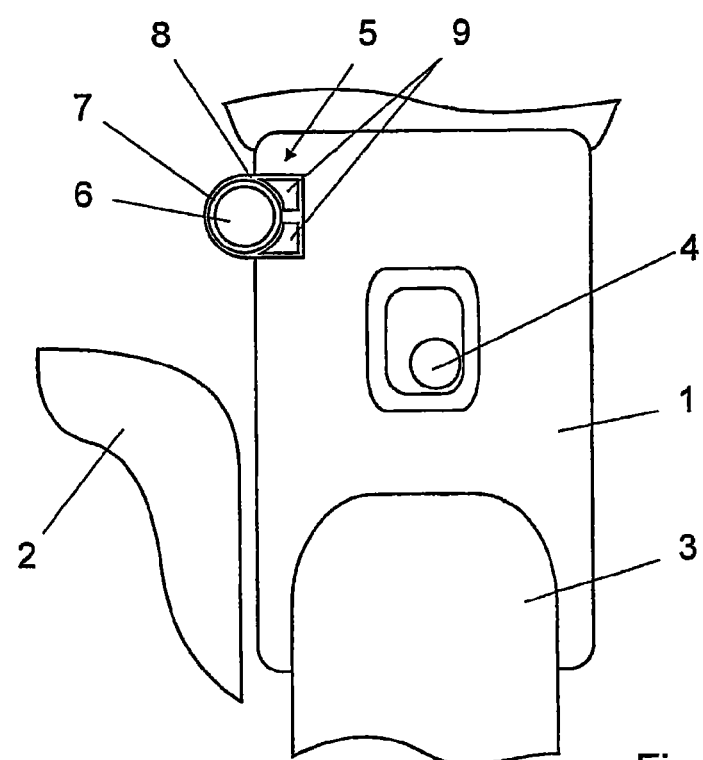
FIG. 2 illustrates an embodiment of the apparatus.

Whereas the apparatus 5 has the frame 8 fitted completely above the center console 1 in the embodiment in FIG. 1, it projects beyond the center console in the embodiment shown in FIG. 2, so that other operator control opportunities and other opportunities for supporting the arm of the operator are obtained.

FIG. 3 illustrates an embodiment of the apparatus 5 in which the frame 8, with the touch-sensitive input panel 6, is mounted on at least one rail, such as two rails 10 running parallel to one another as shown, for example. In this embodiment, the frame 8 with the touch-sensitive input panel 6, the rotatable ring 7, and the switching elements 9 may be displaced. As a further example, the rails 10 may also form a curved path.

The embodiment in FIG. 4 illustrates the apparatus 5 with the frame 8 and the touch-sensitive input panel 6 held therein, the rotatable ring 7, and the switching elements 9 fitted on the armrest 3 instead of on the center console 1. Although not shown, in this embodiment, the frame 8 may also be displaceable on rails 10 fitted on the armrest 3.

FIG. 5 illustrates the touch-sensitive input panel 6 arranged at a distance from a base support, such as from the center console 1 or the armrest 3, for example. The distance between the touch-sensitive input panel 6 and the base support may be greater than or equal to approximately 3 millimeters in order to achieve a floating impression. Alternatively, however, the touch-sensitive input panel 6 may be fitted directly on the surface of the center console 1 or the armrest 3.

In all of the embodiments shown, the rotatable ring 7 surrounding the touch-sensitive input panel 6 and/or the switching elements 9 may be optionally excluded. Also, frame 8 may be optionally excluded if the touch-sensitive input panel 6 were fitted directly on the respective base support, such as the center console 1 or the armrest 3, for example.

The invention has been described in detail with particular reference to preferred embodiments thereof and examples, but it will be understood that variations and modifications can be effected within the spirit and scope of the invention covered by the claims which may include the phrase "at least one of A, B, and C" as an alternative expression that means one or more of A, B, and C may be used, contrary to the holding in *Superguide v. DIRECTV*, 69 USPQ2d 1865 (Fed. Cir. 2004).

The invention claimed is:

1. An operator control apparatus for operator control of at least one function of a motor vehicle, the apparatus comprising:
 a touch-sensitive input panel, mounted on a frame, comprising a transparent material;
 a rotatable ring surrounding the touch-sensitive input panel;
 a switching element arranged next to the touch-sensitive input panel; and
 a base support comprising a material, and a surface selected from the group consisting of a wood surface, a metal surface, and a leather surface,
 wherein
  the touch-sensitive input panel is arranged above and substantially parallel to the base support in a cantilever manner such that, in at least one displacement position on the at least one rail, the touch-sensitive input panel appears to be floating above the base support, and the material and the surface of the base support can selectively be perceived through the touch-sensitive input panel,
  the touch-sensitive input panel is mounted linearly displaceably on at least one rail,
  the rotatable ring controls a first additional function of the motor vehicle, and
  the switching element controls a second additional function of the motor vehicle.

2. The operator control apparatus as claimed in claim 1, wherein the touch-sensitive input panel is fitted on a center console of the motor vehicle.

3. The operator control apparatus as claimed in claim 1, wherein the touch-sensitive input panel is fitted on an armrest of the motor vehicle.

4. The operator control apparatus as claimed in claim 1, wherein the at least one rail forms a curved path.

5. The operator control apparatus as claimed in claim 1, wherein the touch-sensitive input panel is provided in a round shape.

6. The operator control apparatus as claimed in claim 1, wherein the operator control apparatus controls at least one of a navigation appliance, an air conditioning system, and a cruise control system.

7. The operator control apparatus as claimed in claim 1, wherein the touch-sensitive input panel is arranged at a distance from the base support.

8. The operator control apparatus as claimed in claim 7, wherein the distance between the touch-sensitive input panel and the base support is at least 3 millimeters.

9. An operator control apparatus for operator control of at least one function of a motor vehicle having a surface selected from the group consisting of a wood surface, a metal surface, and a leather surface, the apparatus comprising:
 a touch-sensitive input panel, mounted on a frame, comprising a transparent material;
 a rotatable ring surrounding the touch-sensitive input panel; and
 a plurality of switching elements arranged on the frame encompassing the touch-sensitive input panel,
 wherein
  the touch-sensitive input panel is mounted linearly displaceably on at least one rail,
  the touch-sensitive input panel and switching elements are arranged above and substantially parallel to the surface of the motor vehicle such that, in at least one displacement position on the at least one rail, the touch-sensitive input panel appears to be floating above the material forming the surface of the motor vehicle, which can be perceived through the touch-sensitive input panel,
  the frame is mounted to the surface of the motor vehicle in a cantilever manner,
  the rotatable ring controls a first additional function of the motor vehicle, and the switching element controls a second additional function of the motor vehicle.

10. An operator control apparatus, the apparatus comprising:
- a touch-sensitive input panel, comprising a transparent material and mounted linearly displaceably on at least one rail, for operator control of at least one function of a motor vehicle;
- a rotatable ring, surrounding the touch-sensitive input panel, that controls a first additional function of the motor vehicle to extend a functionality of the touch-sensitive input panel;
- a switching element, arranged next to the touch-sensitive input panel and the rotatable ring, that controls a second additional function of the motor vehicle; and
- a motor vehicle interior trim part of a center console of the motor vehicle and comprising at least one of wood, metal, and leather,
- wherein the touch-sensitive input panel is arranged above and substantially parallel to the motor vehicle interior trim part in a cantilever manner such that, in at least one displacement position on the at least one rail, the touch-sensitive input panel appears to be floating above the motor vehicle interior trim part, which can selectively be seen through the touch-sensitive input panel.

* * * * *